United States Patent [19]
Seiden

[11] 3,786,735
[45] Jan. 22, 1974

[54] PHOTOGRAPHIC APPARATUS
[75] Inventor: Myron A. Seiden, Needham, Mass.
[73] Assignee: Polaroid Corporation, Cambridge, Mass.
[22] Filed: Sept. 27, 1972
[21] Appl. No.: 292,487

[52] U.S. Cl. .................................................. 95/49
[51] Int. Cl. ............................................. G03b 17/44
[58] Field of Search ........................................ 95/49

[56] References Cited
UNITED STATES PATENTS
| | | | |
|---|---|---|---|
| 2,397,742 | 4/1946 | Kals | 95/49 X |
| 791,800 | 6/1905 | Laur | 95/53 |
| 1,857,706 | 5/1932 | Zabrocki | 95/49 |

Primary Examiner—John M. Horan
Attorney, Agent, or Firm—Brown and Mikulka

[57] ABSTRACT

An automatic shutter control system for a photographic camera having a removable film holder and viewing screen. When the film holder is attached to the camera, the shutter control system closes down the shutter. Removal of the film holder for viewing and focusing actuates the shutter control system for automatically opening the shutter to a full aperture position in which the available focusing light is maximized. The need for manually opening the shutter to its fully opened position just prior to focusing is thereby alleviated.

5 Claims, 3 Drawing Figures

PHOTOGRAPHIC APPARATUS

BACKGROUND OF THE INVENTION

This invention relates to multi-purpose industrial type cameras characterized in having partially automatic shutter operation and a removable plate holder or film carrier attached to a portion of the camera. Under usual operating procedures, the shutter is manually opened, the camera is focused, and the film carrier is attached to the camera just prior to exposure. Before exposing the film, however, the shutter opening must be set from the wide open focusing position to the desired exposure setting. It is essential that this final step be performed prior to each exposure for well exposed photographs. Should the camera operator neglect to re-adjust the shutter, the shutter will be fully open during exposure and an overexposed photograph may result.

SUMMARY OF THE INVENTION

The present invention is addressed to a camera having an automatic shutter control system for viewing. In the present system, removal of the film carrier for viewing and focusing of the image automatically holds the shutter open to a full aperture position. When the film carrier is attached to the camera, for taking a photograph, the system automatically closes down the shutter so that the latter may be operated in accordance with routine procedures.

In a preferred embodiment of the present invention, the camera includes two shutter releases. One is utilized for taking pictures while the other is employed for automatic control of the shutter during viewing. The latter shutter release is coupled by a conventional cable to a sliding bar arrangement which is automatically displaced upon inserting the film carrier in the camera. Consequently, the shutter is automatically opened when the film carrier is removed from the camera and is closed upon re-insertion of the film carrier in the camera without the need for manual closing of the shutter subsequent to focusing. It should be noted that the present invention is operative to automatically control a diaphragm in much the same way as it controls the shutter. Accordingly, while the term "shutter" is used throughout this specification, it is intended that the invention relates to a diaphragm control system as well.

OBJECTS OF THE INVENTION

It is a general object and feature of the present invention to provide a camera having an automatic shutter control system for viewing an image to be photographed.

Another object and feature of the present invention is to provide a camera having an automatic shutter control system which automatically opens the shutter when the camera's film carrier is removed from the camera and which automatically closes the shutter when the camera's film carrier is inserted into the camera.

Further obects, features and advantages of the invention will in part be obvious and will in part become apparent as the following description proceeds. The features of novelty which characterize the invention will be pointed out with particularity in the claims annexed to and forming a part of this specification.

DETAILED DESCRIPTION OF THE DRAWINGS

Figure 1:
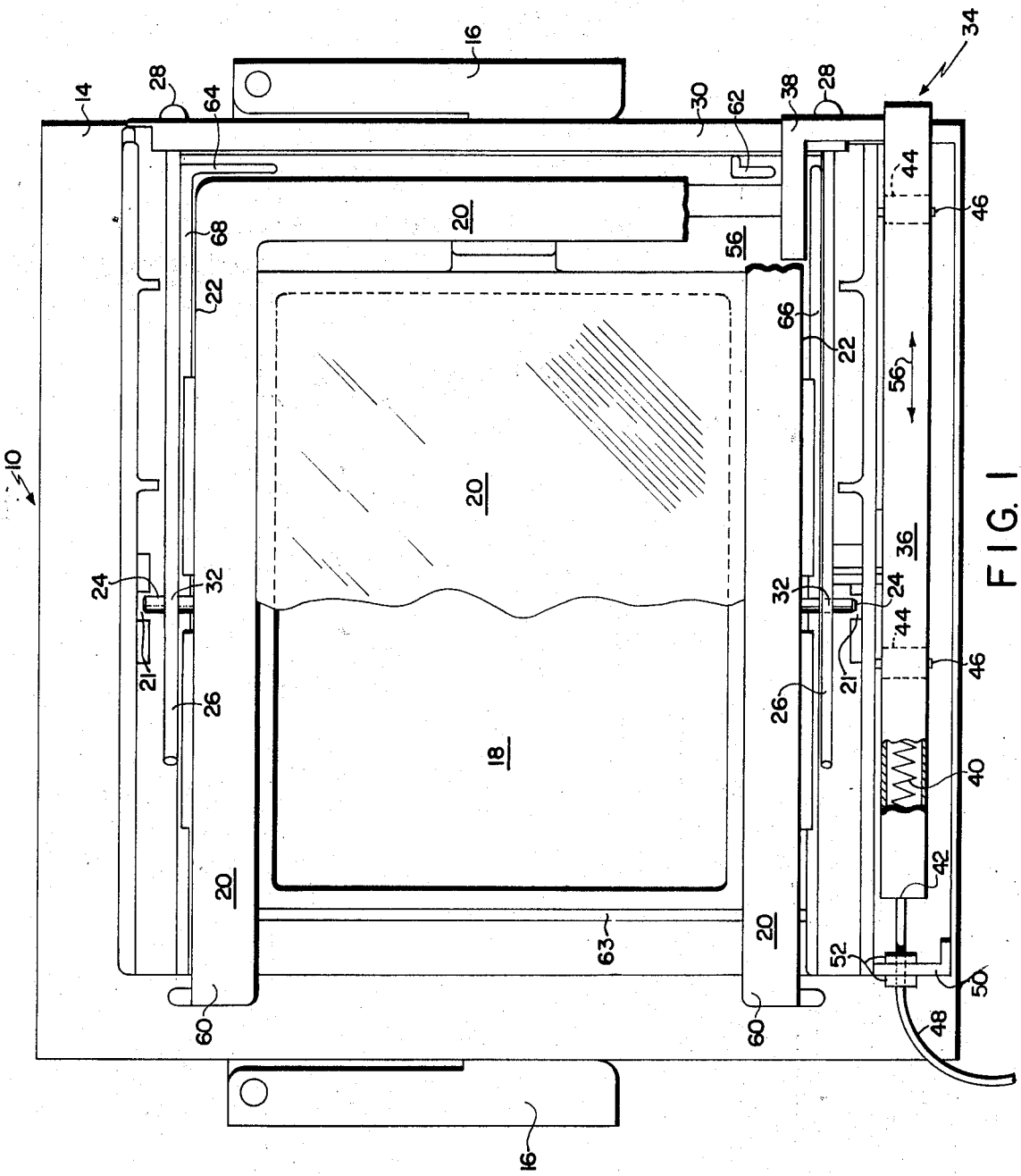
FIG. 1 is a top view of a portion of the present invention with portions broken away to reveal internal detail.
Figure 2:
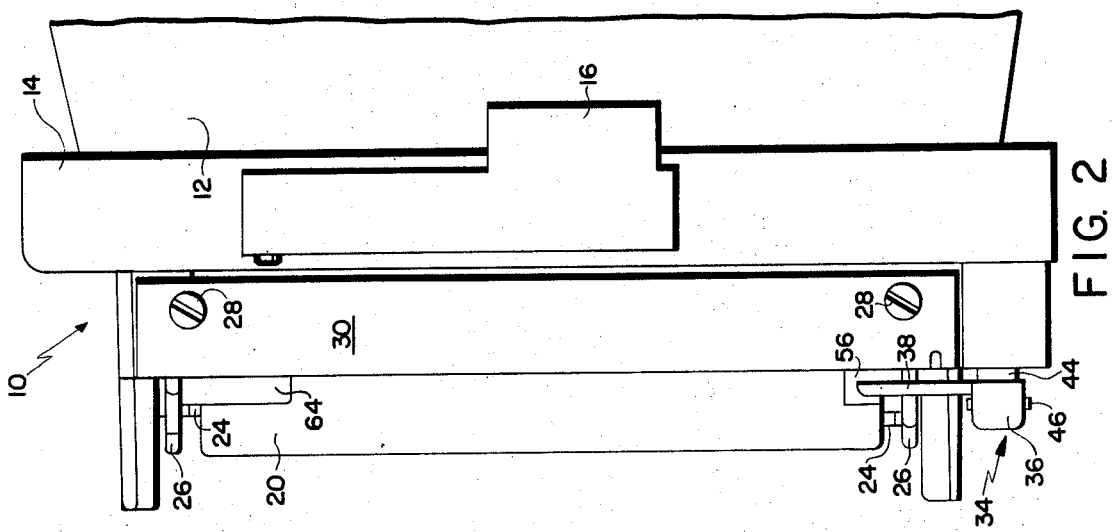
FIG. 2 is a side view of the apparatus of FIG. 1.

Looking to FIGS. 1 and 2, there is shown a camera back 10 adapted for use with a multi-purpose camera, a rear portion of which is shown as at 12. Camera back 10 includes a camera back adapter assembly 14 suitably formed for attachment to the camera's rear portion 12. Back 10 is retained to portion 12 through a pair of latching arms 16 positioned on the lateral edges of assembly 14. Latching arms 16 engage appropriate mechanical linkages (not shown) on rear portion 12 for holding camera back 10 to rear portion 12. An aperture 18 is provided within camera back 10 for permitting viewing and subsequently, for permitting exposure through back 10. A viewing screen 20 is adapted to fit behind back 10 and over aperture 18. Viewing screen 20 may be any one of a variety of screens known in the photographic field.

Viewing screen 20 is fit onto camera back 10 by inserting it into back 10 from the left to the right as viewed in FIG. 1. Provided on the lateral sides 22 of screen 20 are two pins 24. When screen 20 is inserted into back 10, pins 24 slip under a pair of torsion bars 26 located on the rearward side of adapter assembly 14. Torsion bars 26 are biased into adapter assembly 14 and are attached to adapter assembly 14 through two screws 28 located in a torsion plate 30. When screen 20 is fit in adapter assembly 14 (See FIG. 1) pins 24 are engaged by a pair of notches 32 formed in torsion bars 26. The engagement between pins 24 and notches 32 generally locates viewing screen 20 with respect to adapter assembly 14 and aperture 18. Exact location of screen 20 is accomplished by pins 24 falling into two slots 21 located on the top and bottom portions of assembly 14. Additionally, due to the forward biasing (as viewed in FIG. 2) of the torsion bars 26 into adapter assembly 14, pins 24 and consequently, viewing screen 20, are biased into engagement with adapter assembly 14.

Figure 3:
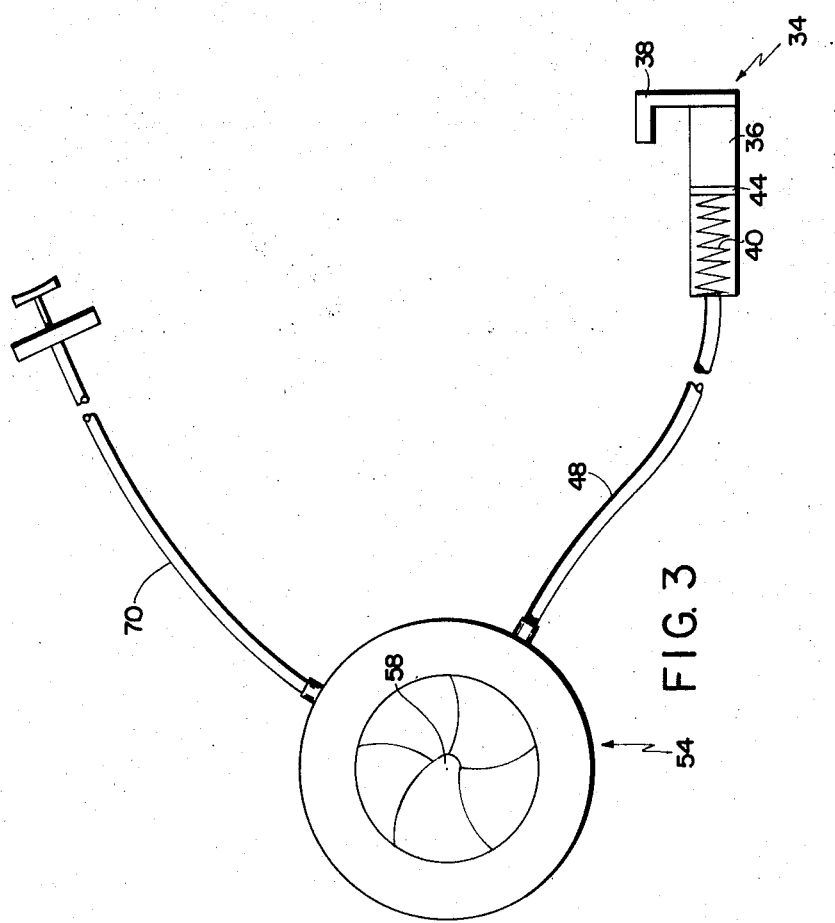
FIG. 3 is a schematic of the present invention.

An actuation arm, shown generally at 34, is located along the bottom portion of adapter assembly 14. Actuation arm 34 includes a hollow rectangular bar portion 36 and an actuation finger portion 38 extending therefrom. Located within hollow rectangular bar portion 36 is a compression spring 40. Compression spring 40 extends between an end 42 of portion 36 to a boss 44 located inside bar portion 36. A pair of roll pins 46 are provided along the length of bar portion 36 of arm 34. Pins 46 extend through lateral slots (not shown) in bar portion 36 and a pair of boss members 44 fixedly attached to adapter assembly 14. Configured as such, actuator arm 34 is able to move laterally in the directions denoted by arrow 56. Connected to end 42 of bar portion 36 is a conventional cable release 48. Cable 48 extends through a wall section 50 and two nuts 52 to a shutter assembly 54 (See FIG. 3).

As may be evidenced from FIG. 1, actuation finger portion 38 extends into an area already occupied by viewing screen 20. For this reason a notch 56 is provided in viewing screen 20 for accommodating finger portion 38 when the viewing screen is on assembly 14. (See FIG. 2)

Operation

The initial step in the operation of the camera incorporating the present invention is focusing. The focusing screen 20 is connected to assembly 14 by fitting screen 20 into assembly 14 from the left to the right as viewed in FIG. 1. Pins 24 are engaged by torsion bars 26 and are captured by notches 32 and slots 21. When properly set, the focusing screen 20 is directly over aperture 18. This status is best shown in FIG. 1. As may be evidenced from the foregoing, actuation arm 34 remains in a position in which finger portion 38 is in notch 56. Actuation arm 34 is maintained in this leftward position by compression spring 40. Specifically, spring 40 is butted up between boss 44 and end 42 of bar 36. Accordingly, spring 40 forces end 42 and bar 36 to the left as viewed in FIG. 1. When bar 36 is in this position, cable 48 is in an extended status and, due to its connection with shutter 54, actuates shutter 54 to retain the shutter blades 58 in a fully opened position in correspondence with normal shutter operating procedures known in the art. The shutter blades 58 will remain in this opened position for as long as bar portion 36 is in the left position shown in FIG. 1. As a result, all focusing will be carried out in the obviously desirable fully open shutter condition. It is in this condition that maximum focusing light is passed from the image through the shutter to the eye of the camera operator. When focusing has been accomplished, the film carrier (not shown) is introduced to the camera's back adapter assembly 14.

The camer's film carrier may be one of a variety of sheet or roll film holders known in the art. In all cases, however, the film carrier has a rectangular shape and is of a size suitable for use with adapter assembly 14. Adaption of the film carrier to the adapter assembly is accomplished in a simple one step process. One edge of the viewing screen 20 is lifted away from adapter assembly 14 by grasping either one of two corners 60 of viewing screen 20 and pulling it away from assembly 14. Next, the film carrier is inserted under viewing screen 20 from the left to the right (See FIG. 1) and is pushed to the right until the leading edge of the film carrier engages finger 38. As the film carrier does not have a notch, further movement of the carrier displaces finger 38 to the right. The film carrier is moved until it is properly seated under viewing screen 20 and the exposure aperture of the film carrier is aligned with the aperture 18 of the adapter assembly 14. Two bosses 62 and 64 prevent the film carrier from being moved completely out of the assembly 14. Proper lateral orientation of the film carrier is accomplished by the engagement between a trough 63 located on assembly 14 and a suitably sized rod (not shown) located on the bottom of the film carrier. Moreover, proper vertical orientation of the film carrier is carried out by two orienting rails 66 and 68 located below and above aperture 18, respectively. When the film carrier is placed under viewing screen 20, torsion bars 26 are expanded and hold both viewing screen 20 and the film carrier downward into engagement with adapter assembly 14. Accordingly, a lighttight seal around the film carrier is provided.

As mentioned previously, the movement of the film carrier into its exposure position displaces finger 38 to the right. This movement of finger 38 moves actuation arm 34 to the right against the bias provided by compression spring 40. Due to the connection between end 42 of bar portion 36 and cable 48, movement of actuation arm 34 to the right releases the cable end at shutter 54 thereby closing shutter blades 58. An exposure may now be taken using a conventional shutter release 70 coupled to shutter 54. Actuation of shutter release 70 will reopen shutter blades 58 to their preset exposure setting and light will pass through aperture 18 and onto the film contained within the film carrier.

Should focusing be desired again, the film carrier is removed in the reverse direction it was installed and focusing screen 20 is returned to its forward position in which it abuts adapter assembly 14. Removal of the film carrier permits finger 38 and actuation arm 34 to return to the left under the bias provided by compression spring 40. When actuation arm 34 has returned, cable 48 is again extended and shutter blades 58 will open to their full aperture focusing position.

It should be self evident that the automatic shutter control of the present invention obviates the need for manually opening the shutter to its fully open position prior to the focusing operation of the camera. As such, the automatic shutter control of the present invention utilizes a simple and uncomplicated mechanism which minimizes exposure errors for which the camera operator had been previously responsible.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic camera having a lens, a shutter, a viewing screen, a removable film holder and means on said camera for accepting said film holder, shutter control means for retaining said shutter in an open status when said film holder is removed from said camera and for closing said shutter when said film holder is inserted in said film holder accepting means, said shutter control means comprising:

arm means, a portion of which is positioned in the path of insertion of said film holder, said arm means being movable by said film holder from a first position in which said arm means is in said path of insertion to a second position in which said arm means is out of said path of insertion when said film holder is inserted in said film holder accepting means;

compression spring means connected to said arm means, said compression spring means being operative to bias said arm means into said path of insertion of said film holder; and cable means, directly connecting said arm means with said shutter; said cable means being operative to open said shutter when said arm means is in said first position and to close said shutter to a predetermined position when said arm means is in said second position, said viewing screen being releasably retained on said camera by said means for accepting said film holder, said viewing screen having means for accommodating said portion of said arm means positioned in said path of insertion of said film holder for preventing movement of said arm means from said first position to said second position when said viewing screen is positioned on said camera and is engageably contacted by said means for accepting said film holder.

2. The shutter control means of claim 1 in which said means for accommodating said portion of said arm means positioned in said path of insertion of said film holder is a notch.

3. The shutter control means of claim 2 in which said film holder breaks said engageable contact between said viewing screen and said means for accepting said film holder when said film holder is inserted in said film holder accepting means.

4. The shutter control means of claim 1 in which said compression spring means is positioned in said arm means, said compression spring means being compressed when said arm means is moved to said second position, by said film holder, said compression spring means being operative to return said arm means to said first position when said film holder is removed from said film holder accepting means.

5. The shutter control means of claim 1 in which said shutter includes an exposure actuationt cable release, said cable means being independent of said exposure actuation cable release.

* * * * *